United States Patent

Konigsburg et al.

[11] Patent Number: 5,931,957
[45] Date of Patent: Aug. 3, 1999

[54] SUPPORT FOR OUT-OF-ORDER EXECUTION OF LOADS AND STORES IN A PROCESSOR

[75] Inventors: Brian R Konigsburg; John Stephen Muhich; Larry Edward Thatcher; Steven Wayne White, all of Austin, Tex.

[73] Assignee: International Business Machines Corporation, Armonk, N.Y.

[21] Appl. No.: 08/829,669

[22] Filed: Mar. 31, 1997

[51] Int. Cl.[6] .............................. G06F 11/00; G06F 9/30
[52] U.S. Cl. ............................................. 714/48; 395/392
[58] Field of Search ................... 395/183.13, 183.14, 395/183.15, 184.01, 185.02, 185.03, 185.04, 392, 394, 395, 580, 584, 595

[56] References Cited

U.S. PATENT DOCUMENTS

| | | | |
|---|---|---|---|
| 5,421,022 | 5/1995 | MacKeen et al. | 395/800 |
| 5,467,473 | 11/1995 | Kahle et al. | 395/800 |
| 5,557,763 | 9/1996 | Senter et al. | 395/375 |
| 5,615,350 | 3/1997 | Hesson et al. | 395/394 |
| 5,666,506 | 9/1997 | Hesson et al. | 395/392 |
| 5,737,636 | 4/1998 | Caffo et al. | 395/874 |
| 5,742,831 | 4/1998 | Creta | 395/732 |
| 5,751,983 | 5/1998 | Abramson et al. | 395/392 |
| 5,751,986 | 5/1998 | Fetterman et al. | 395/394 |
| 5,758,051 | 5/1998 | Moreno et al. | 395/181 |
| 5,778,245 | 7/1998 | Papworth et al. | 395/800.23 |
| 5,784,586 | 7/1998 | Simone et al. | 395/392 |

*Primary Examiner*—Joseph E. Palys
*Attorney, Agent, or Firm*—Kelly K. Kordzik; Winstead Sechrest & Minick P.C.; Anthony V. S. England

[57] ABSTRACT

To support load instructions which execute out-of-order with respect to store instructions, a mechanism is implemented to detect (and correct) the occurrences where a load instruction executed prior to a logically prior store instruction, and where the load instruction received data for the location prior to being modified by the store instruction, and the correct data for the load instruction included bytes from the store instruction. Additionally, to execute store instructions out-of-order with respect to load instructions, a mechanism is implemented to keep a store instruction from destroying data that will be used by a logically earlier load instruction. Further, to support load instructions that are executed out-of-order with respect to each other, a mechanism is implemented to insure that any pair of load instructions (which access at least one byte in common) return data consistent with executing the load instructions in order.

1 Claim, 6 Drawing Sheets

SUPPORT FOR OUT-OF-ORDER EXECUTION OF LOADS AND STORES IN A PROCESSOR

CROSS-REFERENCE TO RELATED PATENT APPLICATIONS

The present application is related to the following applications:

"METHOD FOR FAST UNIFIED INTERRUPT AND BRANCH RECOVERY SUPPORTING FULL OUT-OF-ORDER EXECUTION", U.S. patent application Ser. No. 08/829,662, which is hereby incorporated by reference herein;

"FORWARDING OF RESULTS OF STORE INSTRUCTIONS," U.S. patent application Ser. No. 08/826,854, which is hereby incorporated by reference herein; and "CHECKPOINT TABLE FOR SELECTIVE INSTRUCTION FLUSHING IN A SPECULATIVE EXECUTION UNIT," U.S. patent application Ser. No. 08/934,960, which is hereby incorporated by reference herein.

TECHNICAL FIELD

The present invention relates in general to data processing systems, and in particular, to out-of-order execution of load and store instructions in a processor.

BACKGROUND INFORMATION

To achieve higher performance levels, processor and system designers attempt to increase processor and system clock rates and increase the amount of work done per clock period. Among other influences, striving for higher clock rates drives toward de-coupled designs and semi-autonomous units with minimal synchronization between units. Increased work per clock period is often achieved using additional functional units and attempting to fully exploit the available instruction-level parallelism.

While compilers can attempt to expose the instruction-level parallelism which exists in a program, the combination of attempting to minimize path length and a finite number of architected registers often artificially inhibits a compiler from fully exposing the inherent parallelism of a program. There are many situations (such as the instruction sequence below) where register resources prevent a more optimal sequencing of instructions.

FM FPR5←FPR4, FPR4

FMA FPR2←FPR3, FPR4, FPR5

FMA FPR4←FPR6, FPR7, FPR8

Here, given that most processors have multi-cycle floating point pipelines, the second instruction cannot execute until several cycles after the first instruction starts to execute. In this case, although the source registers of the third instruction might be expected to be available and the third instruction is expected to be ready to execute before the second, the compiler cannot interchange the two instructions without selecting a different register allocation (since the third instruction currently overwrites the FPR4 value used by instruction 2). Often, selecting a register allocation which would be more optimal for this pair of instructions would be in conflict with the optimal register allocation for another instruction pair in the program.

The dynamic behavior of cache misses provides another example where out-of-order execution can exploit more instruction-level parallelism than possible in an in-order machine.

```
Loop:
    Load          GPR4, 8(GPR5)
    Add           GPR6, GPR6, GPR4
    Load          GPR7, 8(GPR3)
    Add           GPR8, GPR8, GPR7
    Load          GPR9, 0(GPR6)
    Load          GPR2, 0(GPR8)
    . . .
    branch conditional  Loop
```

In this example, on some iterations there will be a cache miss for the first load; on other iterations there will be a cache miss for the second load. While there are logically two independent streams of computation, in an in-order processor, processing will halt shortly after a cache miss and it will not resume until the cache miss has been resolved.

This example also shows a cascading effect of out-of-order execution; by allowing progress beyond a stalled instruction (in this example an instruction which is dependent on a load with a cache miss), subsequent cache misses can be detected and the associated miss penalty can be overlapped (at least partially) with the original miss. The likelihood of overlapping cache miss penalties for multiple misses grows with the ability to support out-of-order load/store execution.

As clock rates go higher and higher, being able to overlap the cache miss penalties with useful computation and other cache misses will be of growing importance.

Many current processors extract much of the available instruction-level parallelism by allowing out-of-order execution for all units except for the load/store unit. Mechanisms to support out-of-order execution for non-load/non-store units is well understood; all potential conflicts between two instructions can be detected by simply comparing the register fields specified statically in the instruction.

Out-of-order execution of storage reference instructions is considerably a more difficult problem as conflicts can arise through storage locations, and the conflicts cannot be detected without the knowledge of the addresses being referenced. The generation of the effective/virtual address and the translations to a real address are normally performed as part of the execution of a storage reference instruction. Therefore, when a storage reference instruction is executed before a logically earlier instruction is executed, the address for the logically earlier instruction is not available for comparison during the execution of the current instruction.

To support loads which execute out of order with respect to stores, a mechanism is required to detect (and correct) the occurrences where a load executed prior to a logically prior store; where the load got the data for the location prior to being modified by the store and the correct data for the load included bytes from the store operation.

Similarly, to execute stores out of order with respect to loads, a mechanism is required to keep a store from destroying data which will be used by a logically earlier load.

Finally, to support loads that execute out of order with respect to each other, a mechanism is required to ensure that any pair of loads (which access at least one byte in common) return data consistent with executing the loads in order. This is an architectural requirement enforced by most, if not all, multiprocessor ("MP") systems.

SUMMARY OF THE INVENTION

The foregoing needs are addressed by the present invention, which discloses a processor capable of out-of-order load and store instructions, but provides several mechanisms for detecting certain situations where an out-of-order load or store operation will result in invalid data occurring.

More specifically, the present invention provides a means for detecting the occurrence of the execution of a load instruction ahead of a store instruction, where the load instruction requires data resulting from the store instruction. To accomplish this detection, a comparison is made between the load instruction being executed with store instructions within a store address queue. If there are any common bytes between the load and store instructions, and if the load instruction is logically subsequent to the store instruction, then the load instruction and all subsequent instructions are flushed from the execution units.

Another occurrence that is detected by the present invention is when a load instruction requires data resulting from a store instruction, but the load instruction executes after the store instruction has executed and the load operation received data from the cache while the store operation was still queued in the store address queue (i.e., prior to the store operation updating the cache). To accomplish this detection, the bytes and the program order tags associated with the store instruction being executed and the load instructions within a preload queue are compared. If there are any common bytes, and a load instruction is logically subsequent to the store instruction, then the load instruction and all subsequent instructions are flushed from the execution units.

A third detection is accomplished by the present invention for the occurrence of out-of-order load instructions. If there are any common bytes between a load instruction being executed and any load instruction within a load hit load queue, and the load instruction being executed is logically older than the load instruction within the load hit load queue, and the load instruction in the load hit load queue is beyond the point where the load instructions can be reordered, then the logically younger load instruction and all subsequent instructions are flushed from the execution units.

The foregoing has outlined rather broadly the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

Figure 1:
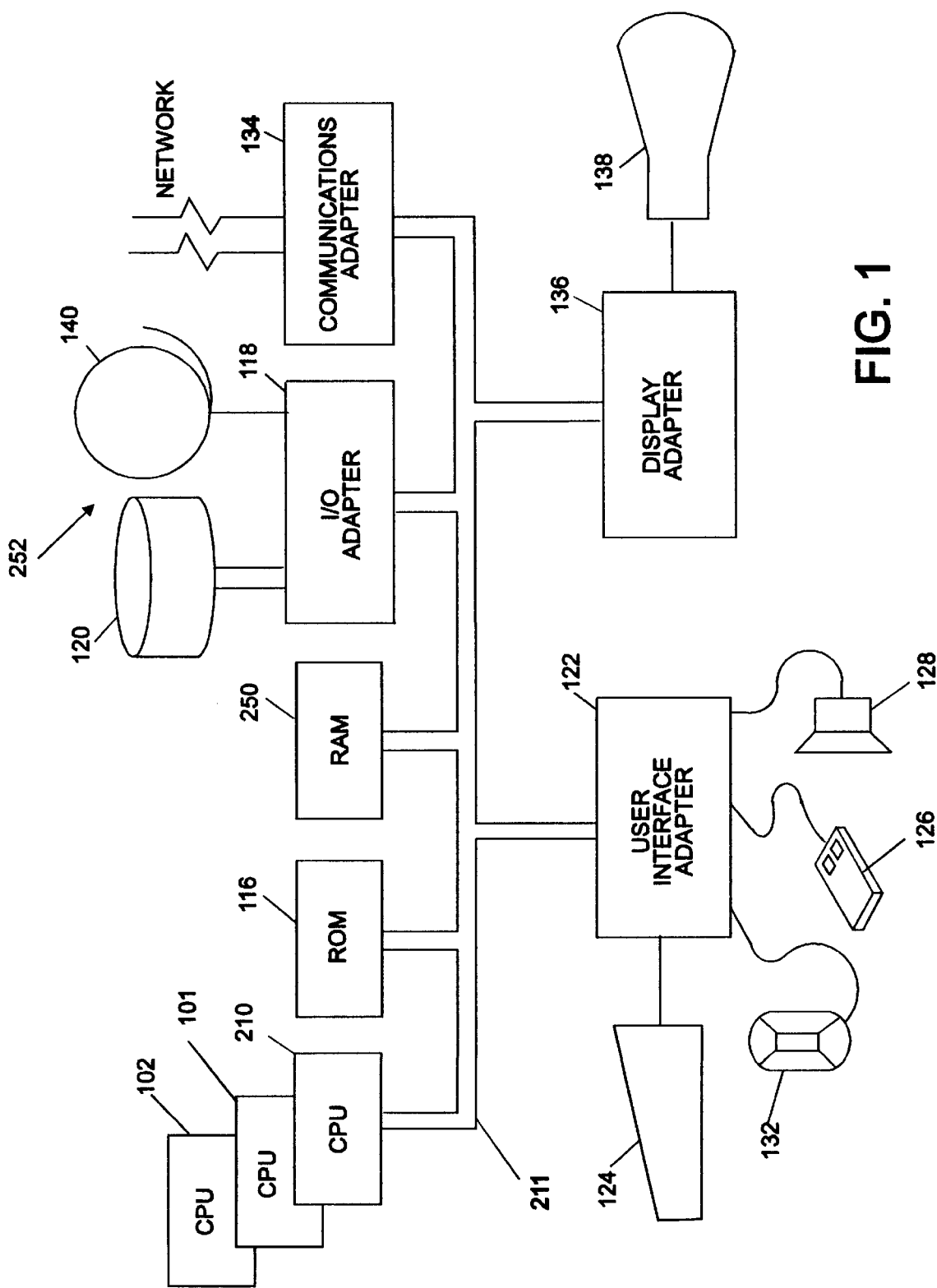
FIG. 1 illustrates a data processing system configurable in accordance with the present invention.

In the following description, numerous specific details are set forth such as specific word or byte lengths, etc. to provide a thorough understanding of the present invention. However, it will be obvious to those skilled in the art that the present invention may be practiced without such specific details. In other instances, well-known circuits have been shown in block diagram form in order not to obscure the present invention in unnecessary detail. For the most part, details concerning timing considerations and the like have been omitted inasmuch as such details are not necessary to obtain a complete understanding of the present invention and are within the skills of persons of ordinary skill in the relevant art.

Refer now to the drawings wherein depicted elements are not necessarily shown to scale and wherein like or similar elements are designated by the same reference numeral through the several views.

Referring first to FIG. 1, an example is shown of a data processing system configurable in accordance with the present invention. The system has a central processing unit ("CPU") 210, such as a PowerPC microprocessor ("PowerPC" is a trademark of IBM Corporation) according to the *"PowerPC Architecture: A Specification for a New Family of RISC Processors,"* 2d edition, 1994, Cathy May, et al. Ed., which is hereby incorporated by reference herein. A more specific implementation of a PowerPC microprocessor is described in the *"PowerPC 604 RISC Microprocessor User's Manual,"* 1994, IBM Corporation, which is hereby incorporated by reference herein.

The CPU 210 is coupled to various other components by system bus. Read only memory ("ROM") 116 is coupled to the system bus 211 and includes a basic input/output system ("BIOS"), which controls certain basic functions of the data processing system. Random access memory ("RAM") 250, I/O adapter 118, and communications adapter 134 are also coupled to the system bus 211. I/O adapter 118 may be a small computer system interface ("SCSI") adapter that communicates with a disk storage device 120 or tape storage drive 140. I/O adapter 118, disk storage device 120, and tape storage device 140 are also referred to herein as mass storage 252. Communications adapter 134 interconnects bus 211 with an outside network enabling the data processing system to communicate with other such systems. Input/output devices are also connected to system bus 211 via user interface adapter 122 and display adapter 136. Keyboard 124, trackball 132, mouse 126, and speaker 128 are all interconnected to bus 211 via user interface adapter 122. Display monitor 138 is connected to system bus 211 by display adapter 136. In this manner, a user is capable of inputting to the system through the keyboard 124, trackball 132, or mouse 126 and receiving output from the system via speaker 128 and display 138. Additionally, an operating system such as AIX ("AIX" is a trademark of the IBM Corporation) is used to coordinate the functions of the various components shown in FIG. 1.

It should be noted that the data processing system configured in accordance with the present invention may be a multi-processing system including processors 101 and 102, in addition to processor 210, coupled to system bus 211.

Figure 2:
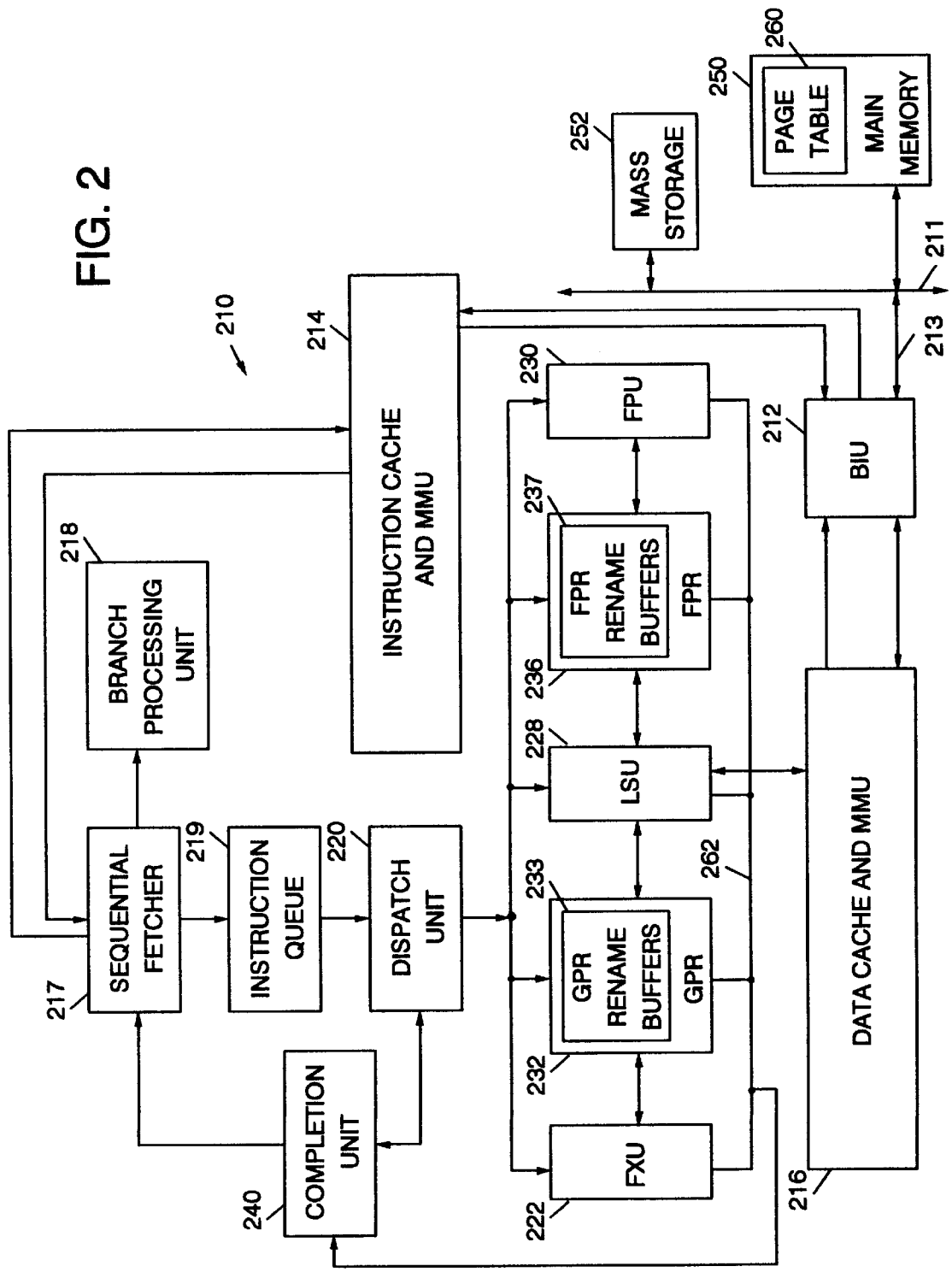
FIG. 2 illustrates a processor configured in accordance with the present invention.

With reference now to FIG. 2, there is depicted a block diagram of an illustrative embodiment of a data processing system for processing information in accordance with the invention recited within the appended claims. In the depicted illustrative embodiment, CPU 210 comprises a single integrated circuit superscalar microprocessor. Accordingly, as discussed further below, CPU 210 includes various execution units, registers, buffers, memories, and other functional units, which are all formed by integrated circuitry. As illustrated in FIG. 2, CPU 210 is coupled to system bus 211 via bus interface unit (BIU) 212 and processor bus 213, which like system bus 211 includes address, data, and control buses. BIU 212 controls the transfer of information between processor 210 and other devices coupled to system bus 211, such as main memory (RAM) 250 and nonvolatile mass storage 252, by participating in bus arbitration. The data processing system illustrated in FIG. 2 may include other unillustrated devices coupled to system bus 211, which are not necessary for an understanding of the following description and are accordingly omitted for the sake of simplicity.

BIU 212 is connected to instruction cache and MMU (Memory Management Unit) 214 and data cache and MMU 216 within CPU 210. High-speed caches, such as those within instruction cache and MMU 214 and data cache and MMU 216, enable CPU 210 to achieve relatively fast access times to a subset of data or instructions previously transferred from main memory 250 to the caches, thus improving the speed of operation of the data processing system. Data and instructions stored within the data cache and instruction cache, respectively, are identified and accessed by address tags, which each comprise a selected number of high-order bits of the physical address of the data or instructions in main memory 250. Instruction cache and MMU 214 is further coupled to sequential fetcher 217, which fetches instructions for execution from instruction cache and MMU 214 during each cycle. Sequential fetcher 217 transmits branch instructions fetched from instruction cache and MMU 214 to branch processing unit ("BPU") 218 for execution, but temporarily stores sequential instructions within instruction queue 219 for execution by other execution circuitry within CPU 210.

In the depicted illustrative embodiment, in addition to BPU 218, the execution circuitry of CPU 210 comprises multiple execution units for executing sequential instructions, including fixed-point-unit ("FXU") 222, load/store unit ("LSU") 228, and floating-point unit ("FPU") 230. Each of execution units 222, 228 and 230 typically executes one or more instructions of a particular type of sequential instructions during each processor cycle. For example, FXU 222 performs fixed-point mathematical and logical operations such as addition, subtraction, ANDing, ORing, and XORing, utilizing source operands received from specified general purpose registers ("GPRs") 232. Following the execution of a fixed-point instruction, FXU 222 outputs the data results of the instruction to GPR buffers 232, which provide storage for the result received on result bus 262. Conversely, FPU 230 typically performs single and double-precision floating-point arithmetic and logical operations, such as floating-point multiplication and division, on source operands received from floating-point registers ("FPRs") 236. FPU 230 outputs data resulting from the execution of floating-point instructions to selected FPR buffers 236, which store the result data. As its name implies, LSU 228 typically executes floating-point and fixed-point instructions which either load data from memory (i.e., either the data cache within data cache and MMU 216 or main memory 250) into selected GPRs 232 or FPRs 236 or which store data from a selected one of GPRs 232 or FPRs 236 to memory 250.

CPU 210 employs both pipelining and out-of-order execution of instructions to further improve the performance of its superscalar architecture. Accordingly, instructions can be executed by FXU 222, LSU 228, and FPU 230 in any order as long as data dependencies are observed. In addition, instructions are processed by each of FXU 222, LSU 228, and FPU 230 at a sequence of pipeline stages. As is typical of high-performance processors, each sequential instruction is processed at five distinct pipeline stages, namely, fetch, decode/dispatch, execute, finish, and completion.

During the fetch stage, sequential fetcher 217 retrieves one or more instructions associated with one or more memory addresses from instruction cache and MMU 214. Sequential instructions fetched from instruction cache and MMU 214 are stored by sequential fetcher 1217 within instruction queue 219. In contrast, sequential fetcher 217 removes (folds out) branch instructions from the instruction stream and forwards them to BPU 218 for execution. BPU 218 includes a branch prediction mechanism, which in one embodiment comprises a dynamic prediction mechanism such as a branch history table. That enables BFU 218 to speculatively execute unresolved conditional branch instructions by predicting whether or not the branch will be taken.

During the decode/dispatch stage, dispatch unit 220 decodes and dispatches one or more instructions from instruction queue 219 to execution units 222, 228, and 230, typically in program order. In a more conventional processor, dispatch unit 220 allocates a rename buffer within GPR rename buffers 233 or FPR rename buffers 237 for each dispatched instruction's result data, and at dispatch, instructions are also stored within the multiple-slot completion buffer of completion unit 240 to await completion. However, the present invention is adaptable to embodiments which require neither rename registers or completion units. According to the depicted illustrative embodiment, CPU 210 tracks the program order of the dispatched instructions during out-of-order execution utilizing unique instruction identifiers.

During the execute stage, execution units 222, 228, and 230 execute instructions received from dispatch unit 220 opportunistically as operands and execution resources for the indicated operations become available. In one embodiment, each of execution units 222, 228, and 230 are equipped with a reservation station that stores instructions dispatched to that execution unit until operands or execution resources become available. After execution of an instruction has terminated, execution units 222, 228, and 230 store data results, if any, within either GPRs or FPRs, depending upon the instruction type. In more conventional processors, execution units 222, 228, and 230 notify completion unit 240 which instructions have finished execution. Finally, instructions are completed in program order out of the completion buffer of completion unit 240. Instructions executed by FXU 222 and FPU 230 are completed by transferring data results of the instructions from GPR rename buffers 233 and FPR rename buffers 237 to GPRs 232 and FPRs 236, respectively.

However, in various embodiments, the invention utilizes the dispatch logic of the processor to "tokenize" a classical Von Neumann instruction stream into a data flow-style format. Thus, data dependencies are not handled by tracking the storage location of source data required by each instruction, as in register renaming, but rather by associating with an instruction certain information which enables tracking source data by reference to another instruction which is to provide the source data. Accordingly, the processor is provided with a target identification ("TID") generator which generates tokens, or tags, each of which is uniquely associated with an instruction upon dispatch. The TIDs are used to retain program order information and track data dependencies.

The dispatch unit 220 in the present invention not only assigns TIDs and dispatches instructions, but also updates various tables which are used to track the status of the dispatched instructions.

The CPU 210 supports out-of-order speculative instruction execution. Instructions may be speculative on a predicted branch direction or speculative beyond an instruction that may cause an interrupt condition. In the event of a branch misprediction or an interrupt, hardware automatically flushes undesired instructions from the pipelines and discards undesired results, presenting the effect of precise exceptions and sequentially executed instructions down the appropriate branch paths. Incorrect speculative results are selectively flushed from all units in one clock cycle, and instruction dispatch can resume the following clock cycle. One group identifier tag ("GID") is assigned per set of instructions bounded by outstanding branch or interruptible instructions.

This invention will be described in terms of an implementation that includes multiple load units and a single store unit. However, it should be clear to one skilled in the art that this invention could be modified to handle other configurations such as a single load/store unit, etc. The proposed invention allows loads to execute out of order with respect to other loads and stores and it allows stores to execute out of order with respect to all loads.

As described above, all instructions are tagged in such a manner that relative age between any two instructions can be easily determined. The mechanism that will be assumed for this description is that of monotonically increasing values (TID). The TID value of each instruction is associated with queue entries and pipeline stages in which it resides.

This TID-based approach allows hardware to implement an instruction flush mechanism (to respond to a processor-generated flush command) by performing a magnitude comparison between the TID associated with the flush command and the TID associated with a particular queue entry or functional unit stage and invalidating the entry if it is for an instruction which is as young or younger than the flushed instruction. All remnants of the flushed instruction (and all subsequent instructions) are "flushed" from the machine and the fetch unit is redirected to fetch starting at the address of the "flushed" instruction.

Figure 3:
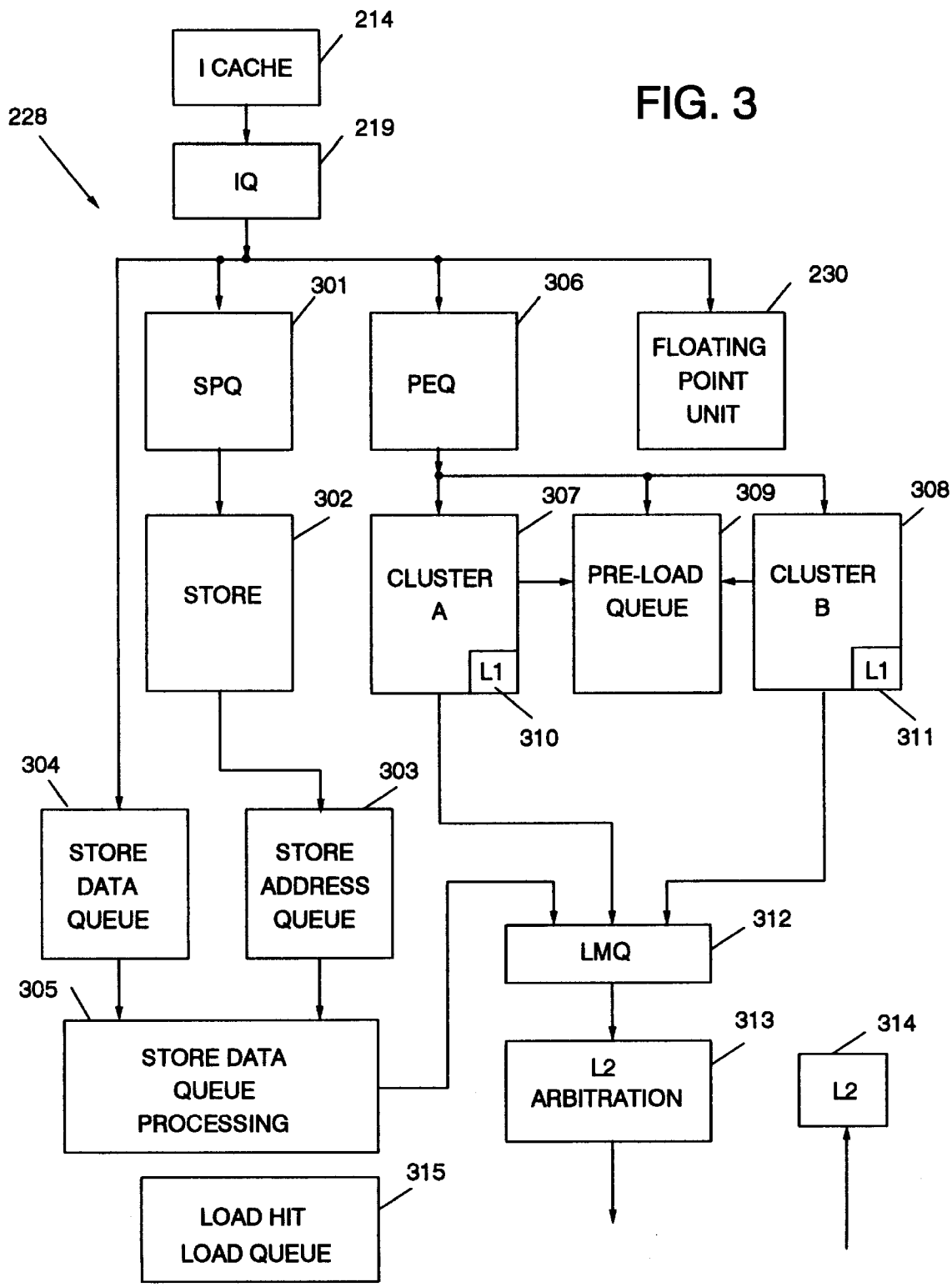
FIG. 3 illustrates further detail of a load/store unit configured in accordance with the present invention.

Refer next to FIG. 3, where there is illustrated further detail of load/store unit 228 coupled to instruction queue 219 and instruction cache 214. Also illustrated is floating point unit 230; however, floating point unit 230 is not a subject of this invention. FIG. 3 illustrates the basic functional units and instruction queues. The functional units are cluster A 307, cluster B 308, and store unit 302. This invention centers around three queues and the interlocks between both these queues and the load and store units. The three queues are:

store address queue 303,
"preload" queue 309, and
"load-hit-load" queue 315.

Entries in each of these queues typically include the TID (or age indicator) of the instruction associated with the entry, the operand address, and the operand byte count. This information allows relative age determination between an entry and any other storage reference, as well as allows overlap detection, down to the byte level if desired.

In one embodiment, "below" dispatch and "above" the load and store units are two instruction queues: all dispatched loads are queued in the "PEQ" 306 while waiting to execute in a load unit, all stores are queued in the "SPQ" 301 while waiting for the store unit 302. At the start of each cycle, hardware determines which store is the oldest dispatched store that has not yet translated, if any such stores exist. For the instruction queue structure described above, this consists of examining the store unit (or units) for any untranslated stores. If any exist, the oldest one is deemed the "oldest untranslated store." If none exist, the SPQ 301 is examined to find the oldest untranslated store. If such a store is found, it is deemed as the "oldest untranslated store." If none are found, the "oldest untranslated store" pointer defaults to the next instruction to be dispatched.

The store address queue 303 is a FIFO list of all stores that have translated, but the associated data has not yet been written to the L1 cache 310, 311. Entries are created as a result of the translation of store instructions at execute; entries are removed as a result of writing the associated data to the L1 cache 310, 311. Associated with the store address queue 303 is the store data queue 304. As stores are dispatched, entries are allocated in the store data queue 304. If the store data is available as the entry is allocated, the data is placed in the store data queue 304. Otherwise, as the data is generated by the functional units, the store data queue 304 will snoop the result buses and capture the data in the store data queue 304. Like the store address queue 303, entries are removed as bytes are written to the L1 cache 310, 311.

The store data queue 304 and the store address queue 303 are coupled to the store data queue processing unit 305, which is coupled to the load miss queue 312, which is coupled to the L2 cache arbitration logic 313. Further description of these units is not presented, since such a description is not necessary for describing the present invention. Please note that other functional blocks may be implemented within load/store execution unit 228, but have not been shown for reasons of simplicity and clarity.

If both the store execution unit 302 and SPQ 301 were examined concurrently and with equal weight, then this invention is extendable to the case where stores are executed out of order with respect to other stores. In this description, it is assumed that stores execute in order; therefore, the execution unit 302 is examined first and with higher priority for establishing a store as the "oldest untranslated store." In-order execution of stores also implies that the store address queue 303 can be managed as a first-in-first-out (FIFO) queue while avoiding deadlock concerns stemming from store address queue space.

The preload queue 309 is specific to this invention and holds the addresses of all translated loads which logically follow the "oldest untranslated store." At the start of each cycle, it is determined whether any loads executing in the load unit are logically subsequent instructions to the "oldest untranslated store." If they are, then they are considered "preloads" and require an entry in the preload queue 309 to execute. If no room exists in the preload queue 309 and an entry is needed, one of two actions results:

If the load in execute is younger than (logically subsequent to) all loads in the preload queue 309, then this load (and all subsequent instructions) is flushed from the machine 210 and the instruction fetch unit 217 is redirected to begin fetching at the address of the flushed load instruction.

If an entry in the preload queue 309 is younger than the load in execute that requires a preload queue entry, then the youngest load in the preload queue 309 (and subsequent instructions) is flushed and re-fetched and the load in execute is given the flushed load's entry in the preload queue 309.

For implementations that allow more than one load in execute to require a preload queue entry in the same cycle, the above is modified in a straightforward manner, namely the results are as if the loads are processed by the above rules, one load at a time, starting with the oldest load. For example, if two loads in execute each require a preload queue entry and only one entry exists, then the oldest load in execute gets the available entry and then the youngest load in execute follows the rules above, for a full queue 309.

At the end of each cycle, valid entries in the preload queue 309 are compared to the "oldest untranslated store" age; any entries which are older than (logically prior to) the "oldest untranslated store" are invalidated (discarded). Preload queue entries can also be invalidated as a result of a flush command if the preload queue entry is for a load instruction which is the subject (or younger) instruction of a flush command.

The store address queue 303 contains the addresses of stores that have been translated but have not yet written their data to the cache 310, 311. In addition to the purposes used by this invention, this queue 303 allows stores to be translated and exceptions detected without waiting for the store data. De-coupling these two portions of a store instruction is key to de-coupling the fixed-point portion of the processor 210 (which usually does the address generation/translation for storage references) from the floating-point portion 230 (which generates/normalizes floating-point data). Several current designs include such store address queues 303. As in most existing implementations, the store address queue 303 is managed in a FIFO manner and the oldest entry in the store address queue 303 is the next entry to write to the cache 310, 311. It should be clear to one skilled in the art that entries other than the oldest entry could be written to the cache 310, 311, allowing younger stores with data to write ahead of older stores waiting on data. It should also be clear that the invention as described would not require modification to handle this improvement.

Store address queue entries are invalidated (discarded) under two conditions:

The associated store operation has been performed to the cache 310, 311, or

A flush command signals that a store address queue entry should be discarded because it is younger than the subject of an instruction flush command.

Figure 6:
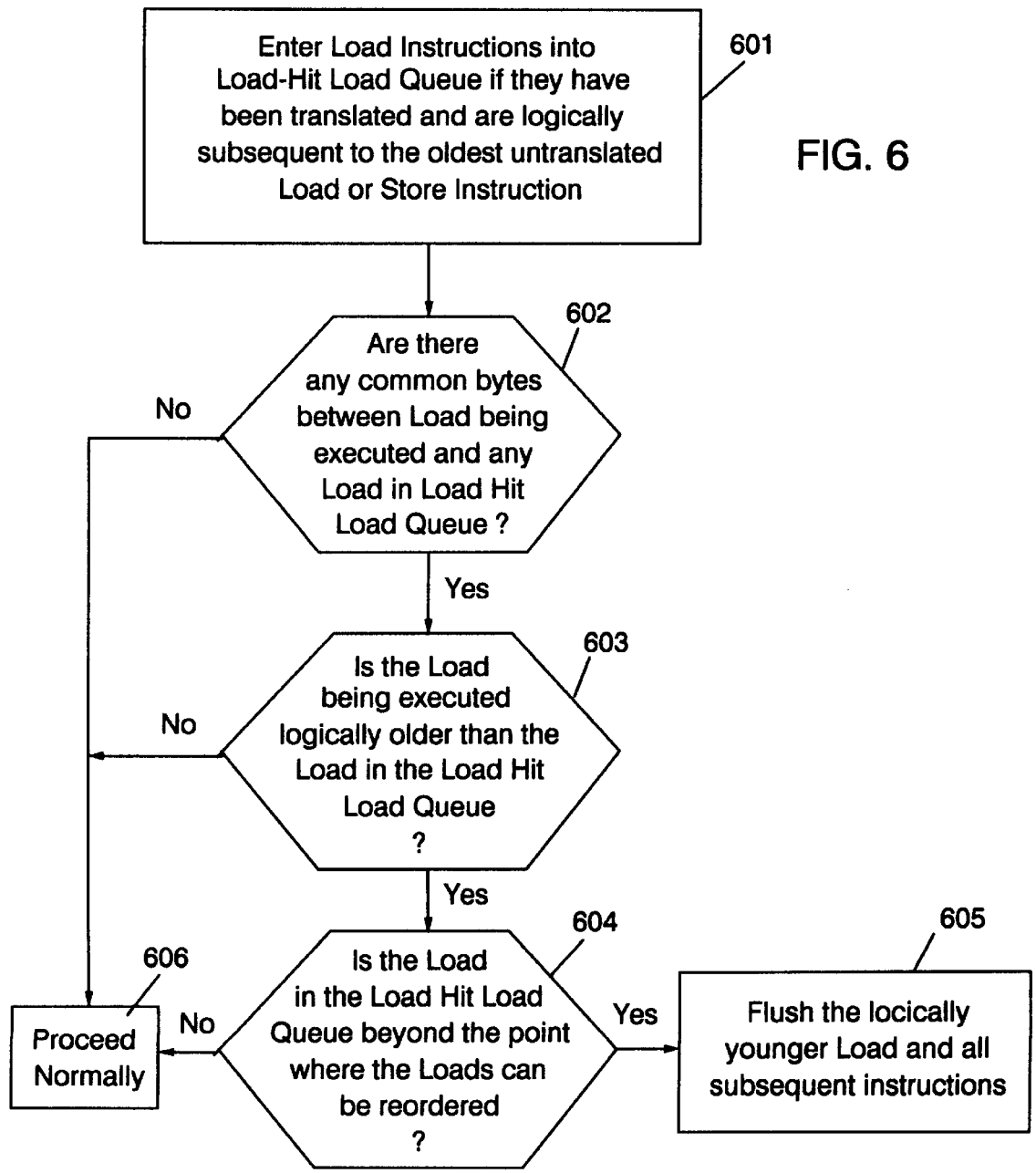

The load-hit-load queue 315 is specific to this invention and holds the addresses of all translated loads that logically follow the oldest untranslated load or store (see step 601 of FIG. 6). At the start of each cycle, it is determined whether any loads executing in the load unit are logically subsequent instructions to the oldest untranslated load or store. If they are, then they require an entry in the load-hit-load queue 315 to execute. If no room exists in the load-hit-load queue 315 and an entry is needed, one of two actions results:

If the load in execute is younger than (logically subsequent to) all loads in the load-hit-load queue 315, then this load (and all subsequent instructions) is flushed from the machine 210 and the instruction fetch unit 217 is redirected to begin fetching at the address of the flushed load instruction.

If an entry in the load-hit-load queue 315 is younger than the load in execute which requires a preload queue entry, then the youngest load in the load-hit-load queue 315 (and subsequent instructions) is flushed and re-fetched and the load in execute is given the flushed load's entry in the load-hit-load queue 315.

For implementations that allow more than one load in execute to require a load-hit-load queue entry in the same cycle, the above is modified in a straightforward manner, namely the results are as if the loads are processed by the above rules, one load at a time, starting with the oldest load. For example, if two loads in execute each require a load-hit-load queue entry and only one entry exists, then the oldest load in execute gets the available entry and then the youngest load in execute follows the rules above for a full queue 315.

At the end of each cycle, valid entries in the load-hit-load queue 315 are compared to the oldest untranslated load or store age; any entries which are older than (logically prior to) the oldest untranslated load and oldest untranslated store are invalidated (discarded). Load-hit-load queue entries can also be invalidated as a result of a flush command if the load-hit-load queue entry is for a load instruction which is the subject (or younger) instruction of a flush command.

Note that the preload queue 309 and load-hit-load queue 315 contain similar information and, in some implementations, could be merged into a single structure.

The above description details the conditions under which entries are created and discarded in the three primary queues for this invention: the preload queue 309, the store address queue 303, and the load-hit-load queue 315. This next section details the address checks which are performed between queue entries to provide architectural storage consistency requirements described previously herein.

Figure 4:
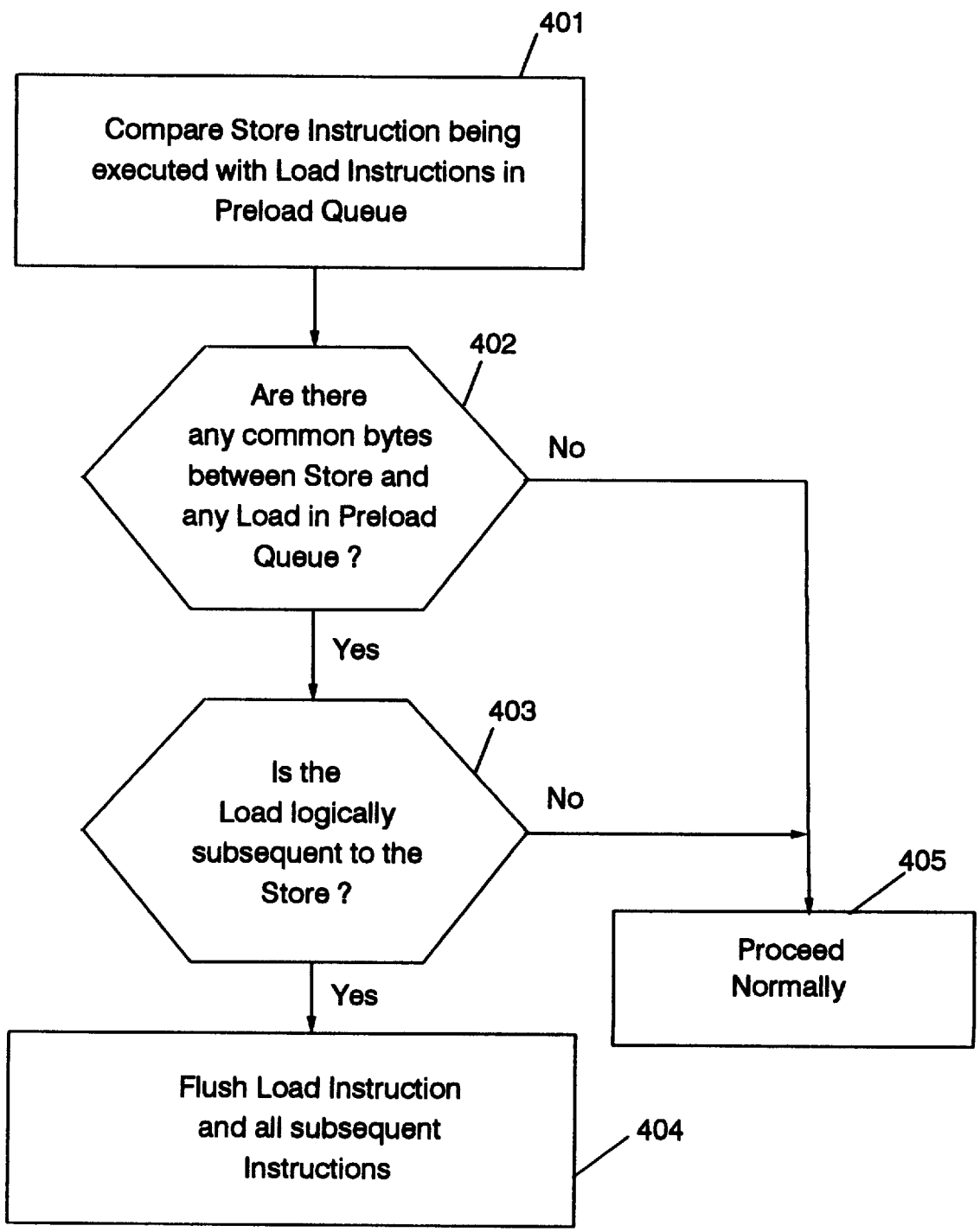
FIGS. 4–6 illustrate processes for detecting out-of-order load and store operations.

Referring next to FIG. 4, to detect the occurrence of a load that executed ahead of a store, but actually requires data from the store, the mechanism involves a comparison (step 401) between the store currently in execute (and being translated) "this cycle" and loads which are in the preload queue 309. These preload queue entries represent all loads that executed earlier and which could possibly have an address conflict with the current store. If it is determined that there are some bytes in common given the address and byte count for the store and the address and byte count for a preload entry (step 402), and that the preload queue entry is for a load that is logically subsequent to the store (step 403), then the data returned for the load should include data generated by the store. However, the load may have accessed a "stale" copy of the data from the cache 310, 311 prior to being updated by the contents of the current store. In this case, a flush command is generated to flush the offending load (and all subsequent instructions) from the machine and the fetch mechanism is directed to fetch starting at the address of the flushed load (step 404). Otherwise, in step 405, the process proceeds normally.

Figure 5:
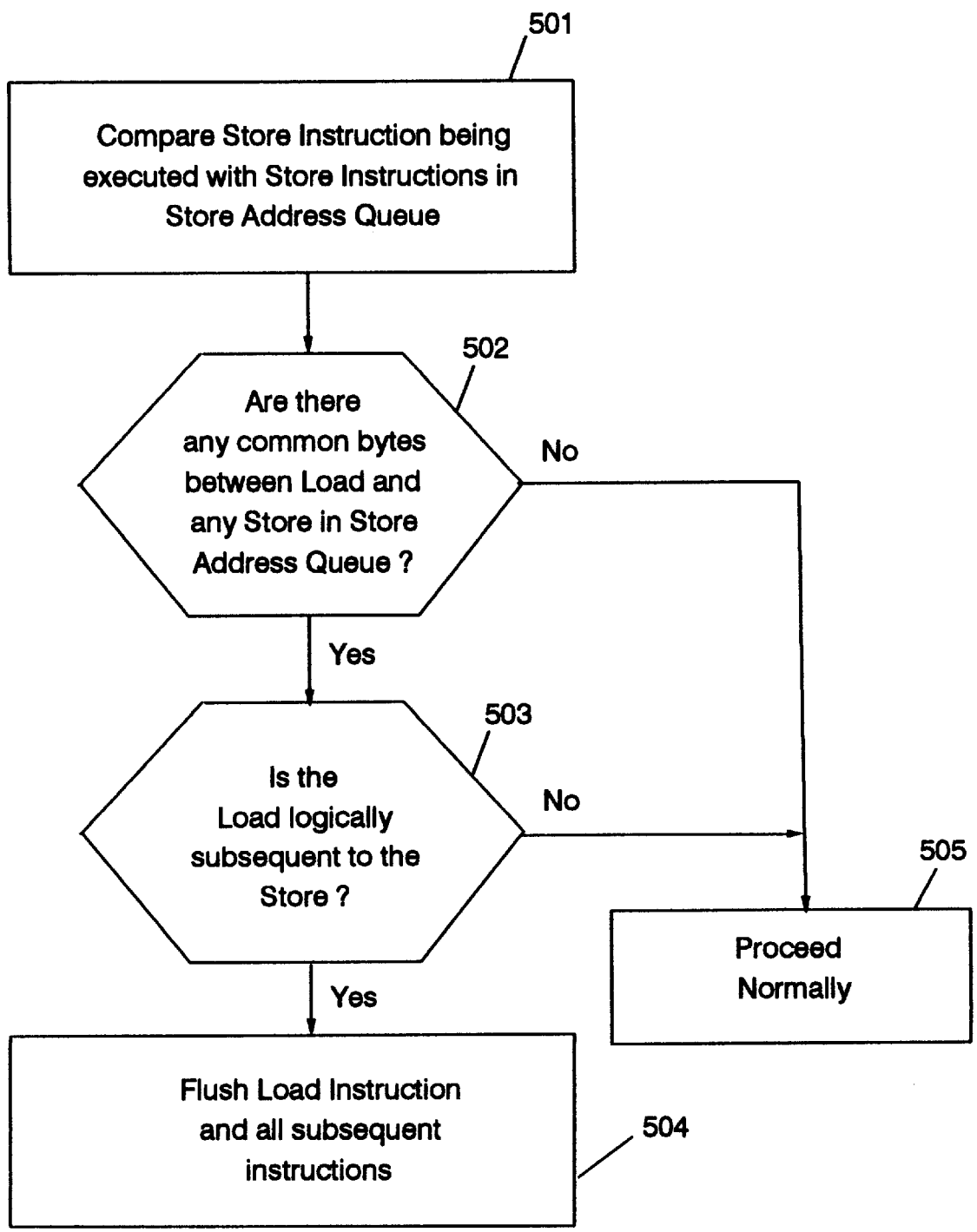

Referring next to FIG. 5, another example to consider is where a load requires data from a store the load executes after the store executed, and the load operation got data from the cache 310, 311 while the store operation was still queued in the store address queue 303 (i.e. prior to the store operation updating the cache 310, 311)

This example can be detected by comparing each load in execute to each store address queue entry (step 501). If a load/store comparison pair indicates that the load is logically later than the store (step 503), the load requires bytes from the store (step 502), and the load got data prior to the store updating the cache, then a flush command is generated to flush the offending load (and all subsequent instructions) from the machine 210, and the fetch mechanism is directed to fetch starting at the address of the load (step 504). (A similar check is performed in existing in-order machines which implement a store address queue; however, they hold the load in execute and re-access the cache once the store operation updates the cache.)

Assuming that preload queue entries and store address queue entries are created essentially at the end of the execute cycle, one final set of checks is required to handle the case for a load and store that execute during the same cycle. A straightforward solution is to construct the logic (which checks loads in execute against the store address queue 303) so that a store at execute appears logically as one extra store address queue entry. To allow out-of-order stores with respect to loads, while preventing stores from destroying data which might be required by a logically earlier load, stores are prohibited from updating the cache 310, 311 until all prior interruptible instructions are known not to generate an exception. (This is an existing necessary condition in most processors since detecting an interrupt exception for a logically earlier instruction after performing a store operation would require additional complexity to restore the cache 310, 311 to the state as expected at the interrupt point.) Assuming the cache path access time is the same (or longer) for a store as for a load, and that the load cache access is performed in parallel with the load translation check (which is done prior to posting the load's interrupt exception status), then the above interlock will allow load to access the cache 310, 311 and get the "old" data prior to the location being updated by any logically subsequent store. This part of the mechanism requires no address comparison. If a load generates a cache miss, then it is known that the cache miss condition also exists for any store operation for which bytes overlap with the load. The correct data consistency can be enforced in this case by ensuring that logically earlier loads get data from cache misses prior to stores updating the same cache line.

Referring next to FIG. 6, the third storage architecture requirement described above is that (for a pair of loads which access at least one byte in common) loads return data consistent with executing the loads in order. Consider an MP system (see FIG. 1) where processor P1 210 is executing a sequence of loads to real address RA while processor P2 101 performs a store to the same address RA. If P1 210 executes the two loads L1A and L2A out of order, then L2A may get the RA value before P2 101 stores while L1A could get the RA value after the P2 store. This could cause incorrect program behavior on P1 210 based on the standard program model.

The goal of the load-hit-load queue 315 is to detect such conditions and force the older load to return the data equal to or older than the younger load. One possible solution would detect a store from another processor that may (or does) fall between two out-of-order loads. This requires address comparators and the ability to recover when this event is detected in an out-of-order machine, and may require significantly more queue space to hold state required for a potential recovery. The solution of the present invention is to enforce age-based ordering between loads that have executed and to provide recovery for those cases where a load that is executing is already in possible violation of the load-load ordering rules.

Specifically, load-load ordering can be determined at the time a load executes. If a load in execute does not match an entry in the load-hit-load queue, the loads progresses normally. If the load does match (at least a one-byte overlap) a load-hit-load queue entry (step 602) and the load in execute is younger (step 603) or the load-hit-load queue element is not beyond the point where the loads can be reordered (step 604), the loads are reordered (change or mark instructions in the load-hit-load queue 315 such that the oldest load receives its data first) and then progress normally (step 606). If the load in execute matches a load-hit-load queue element (step 602), the load in execute is older than the load-hit-load queue element (step 603) and the load-hit-load queue element is beyond the point where the loads could be reordered (step 604), the younger load (and all subsequent instructions) are flushed from the processor and the fetch mechanism is directed to fetch starting at the address of the flushed load (step 605).

Note that in all of the above cases where a flush command is generated, it is generated for the offending load.

Although the present invention and its advantages have been described in detail, it should be understood that various changes, substitutions and alterations can be made herein without departing from the spirit and scope of the invention as defined by the appended claims.

What is claimed is:

1. A multi-processor system comprising:
a first processor;
a second processor coupled to the first processor and a memory system via a bus system;
wherein the first and second processors each comprise:
a store execution unit;
a load execution unit;
an issue unit operable for issuing load and store instructions to the load execution unit and the store execution unit, respectively, in an out-of-order sequence;
circuitry for comparing a first store instruction being executed with first load instructions in a preload queue;
circuitry for determining whether there are any common bytes between the first store instruction and any of the first load instructions in the preload queue;
if there are any common bytes between the first store instruction and any first load instructions in the preload queue, then circuitry for determining if one of the first load instructions in the preload queue having any common bytes with the first store instruction is logically subsequent to the first store instruction;
if one of the first load instructions is logically subsequent to the first store instruction, circuitry for flushing one of the first load instructions and all subsequent instructions;
circuitry for comparing a second load instruction being executed with second store instructions in a store address queue;
circuitry for determining if there are any common bytes between the second load instruction and any of the second store instructions in the store address queue;
if there are any common bytes between the second load instruction and any of the second store instructions in the store address queue, circuitry for determining if the second load instruction is logically subsequent to any of the second store instructions;
if the second load instruction is logically subsequent to any of the second store instructions, circuitry for flushing the second load instruction and all subsequent instructions;
circuitry for entering third load instructions into a load hit load queue if the loaded instructions have been translated and are logically subsequent to an oldest untranslated load or store instruction;
circuitry for determining if there are any common bytes between a third load instruction being executed and any load instruction in the load hit load queue;
if there are any common bytes between the third load instruction being executed and any load instruction in the load hit load queue, circuitry for determining if the third load instruction being executed is logically older than the load instruction in the load hit load queue;
if the third load instruction being executed is logically older than the load instruction in the load hit load queue, circuitry for determining if the third load instruction in the load hit load queue is beyond the point where the load instructions in the load hit load queue can be reordered; and
if the load instruction in the load hit load queue is beyond the point where the load instructions in the load hit load queue can be reordered, circuitry for flushing the logically younger load instruction and all subsequent instructions.

* * * * *